(12) United States Patent
Lee

(10) Patent No.: US 8,709,649 B2
(45) Date of Patent: Apr. 29, 2014

(54) ELECTRODE TAB FOR SECONDARY BATTERY AND SECONDARY BATTERY USING THE SAME

(75) Inventor: Jang-Ho Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1048 days.

(21) Appl. No.: 12/327,713

(22) Filed: Dec. 3, 2008

(65) Prior Publication Data

US 2009/0162749 A1  Jun. 25, 2009

(30) Foreign Application Priority Data

Dec. 21, 2007 (KR) ........................ 10-2007-0135286

(51) Int. Cl.
H01M 4/02 (2006.01)
H01M 4/13 (2010.01)
H01M 2/26 (2006.01)
H01M 2/08 (2006.01)

(52) U.S. Cl.
USPC ............................. 429/211; 429/121; 429/185

(58) Field of Classification Search
USPC ........................................ 429/121, 211, 185
See application file for complete search history.

(56) References Cited

FOREIGN PATENT DOCUMENTS

| JP | 10-040899 | 2/1998 |
|---|---|---|
| KR | 10-1997-0077783 | 12/1997 |
| KR | 2003-0066172 | 8/2003 |
| KR | 10-2006-0011312 | 2/2006 |
| KR | 10-2006-0027265 | 3/2006 |

OTHER PUBLICATIONS

Korean Notice of Allowability dated May 17, 2010, for priority Korean Patent application 10-007-0135286.
KIPO Office action dated Aug. 19, 2009, for priority Korean application 10-2007-0135286.

Primary Examiner — Helen O Conley
(74) Attorney, Agent, or Firm — Christie, Parker & Hale, LLP

(57) ABSTRACT

A secondary battery includes an electrode assembly having a first electrode plate electrically connected to a first electrode tab and a second electrode plate electrically connected to a second electrode tab and an outer casing housing the electrode assembly. At least one of the first electrode tab or the second electrode tab includes at least one first groove extending in a longitudinal direction.

11 Claims, 4 Drawing Sheets

ELECTRODE TAB FOR SECONDARY BATTERY AND SECONDARY BATTERY USING THE SAME

CROSS-REFERENCE TO RELATED APPLICATION

This application claims priority to and the benefit of Korean Patent Application No. 10-2007-0135286, filed Dec. 21, 2007, the entire content of which is hereby incorporated herein by reference.

BACKGROUND OF THE INVENTION

1. Field of the Invention

The present invention relates to an electrode tab for a secondary battery and a secondary battery using the same.

2. Description of the Related Art

Secondary batteries are rechargeable batteries using reversible conversion between chemical energy and electrical energy.

As portable electronic appliances such as mobile phones, notebook computers, PDAs and camcorders are further developed, a demand for secondary batteries, especially lithium secondary batteries, is rapidly increasing.

Such lithium secondary batteries include lithium metal secondary batteries, lithium ion secondary batteries, lithium ion polymer secondary batteries and lithium polymer secondary batteries.

Lithium ion secondary batteries having a voltage of 3.6V are widely used because of their high performance and light weight.

Typical lithium ion secondary batteries include an electrode assembly having a positive electrode plate, a negative electrode plate and a separator, and an electrolyte for transferring lithium ions.

Further, lithium ion secondary batteries may include a protection circuit to prevent explosion and inflammation caused by a leakage of the electrolyte or by an increase in internal pressure.

A conventional lithium polymer secondary battery having a voltage of 3.6V has a low possibility of explosion, and may be formed in various shapes by using a gel-type electrolyte.

A conventional lithium polymer secondary battery includes an electrode assembly having a positive electrode plate, a negative electrode plate and a separator interposed between the two electrode plates to serve as an isolation layer and simultaneously as an electrolyte.

Lithium polymer secondary batteries are resistant to a chemical reaction caused by overcharge or overdischarge by using a polymer gel-type electrolyte, and therefore do not need a protection circuit.

Such lithium secondary batteries may be classified into prismatic, cylindrical and pouch types according to the shape of an outer casing accommodating an electrode assembly.

Electrode tabs are attached to positive and negative electrode plates to transmit electrons generated from the electrode assembly accommodated in the outer casing to the exterior.

When an external pressure is applied to the outer casing accommodating the electrode assembly to which the electrode tab is attached, the outer casing and the electrode assembly accommodated therein may be transformed, i.e., bent or distorted.

The electrode tab may also be distorted, depending on its position relative to where the external pressure is applied, or it may maintain its original shape without distortion.

When the electrode assembly is distorted, but the electrode tab is not distorted, the electrode assembly may be damaged by a corner of the electrode tab, and thus an electrical short circuit may occur in the damaged portion.

More specifically, the electrical short circuit may easily occur when the electrode assembly is bent toward the electrode tab at the corner of the electrode tab.

Moreover, the electrical short may easily occur at a long side of the electrode tab, rather than a short side thereof.

SUMMARY OF THE INVENTION

Aspects of the present invention are directed to providing an electrode tab and a secondary battery using the same, which can be easily distorted or transformed by an external pressure, and thus increase stability of the secondary battery.

According to one embodiment of the present invention, a secondary battery is provided including an electrode assembly having a first electrode plate electrically connected to a first electrode tab and a second electrode plate electrically connected to a second electrode tab and an outer casing housing the electrode assembly. At least one of the first electrode tab or the second electrode tab includes at least one first groove extending in a longitudinal direction.

The outer casing may have a pouch shape, a prismatic shape or an oval shape having rounded corners. The outer casing may include an opening and a cap assembly covering the opening.

The at least one first groove may extend along the center of substantially an entire length of the first electrode tab or the second electrode tab. When there are a plurality of first grooves, the first grooves may be spaced at regular intervals along a width of the first electrode tab or the second electrode tab.

The first electrode tab or the second electrode tab may further include at least one second groove extending along a width direction of the first electrode tab or the second electrode tab.

DETAILED DESCRIPTION

Figure 1:
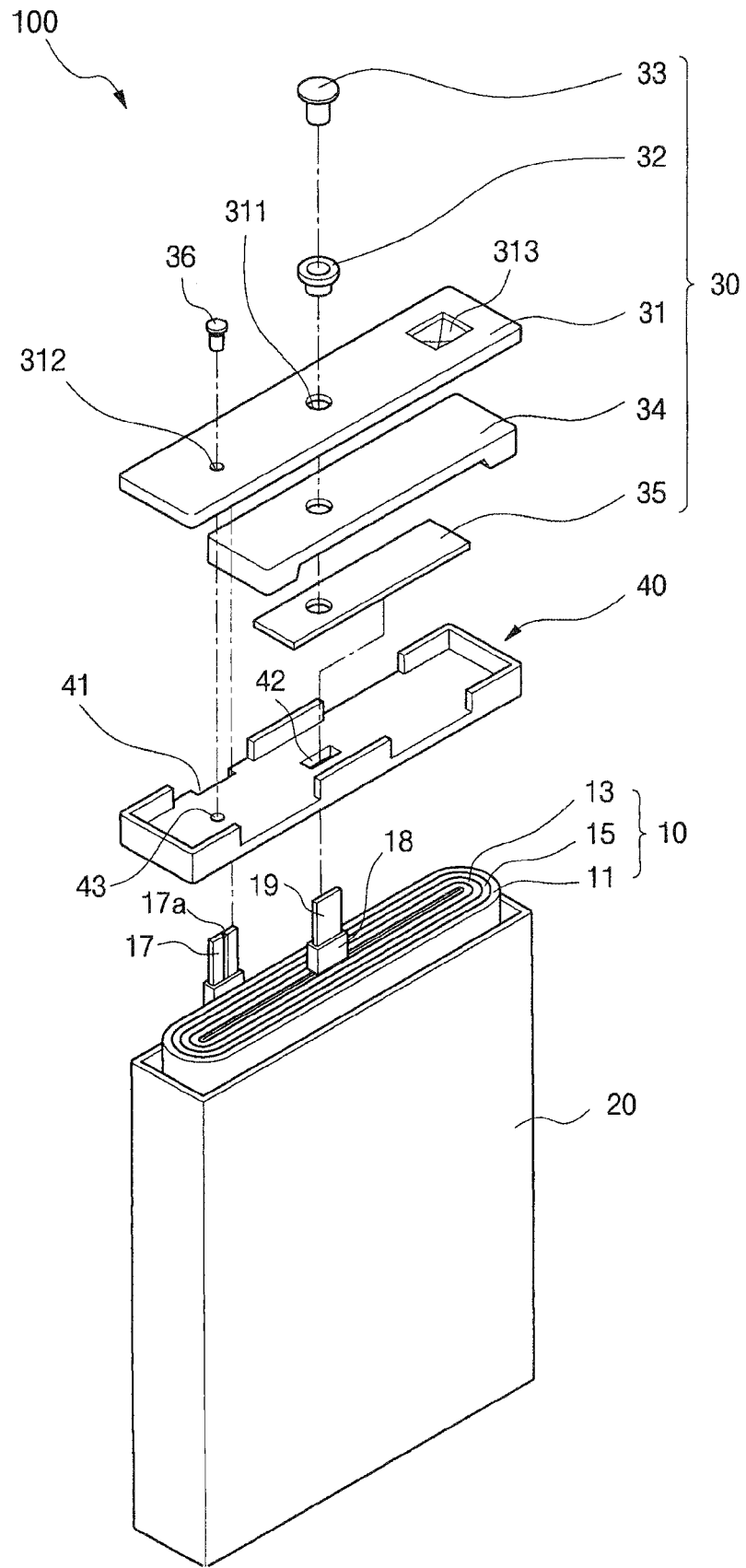
FIG. 1 is an exploded perspective view of a secondary battery according to a first embodiment of the present invention.

Referring to FIG. 1, a secondary battery 100 includes an electrode assembly 10, an outer casing 20 housing the electrode assembly 10, and a cap assembly 30 disposed at an opening of the outer case 20.

Further, the secondary battery 100 may include an insulating case 40 disposed at an upper portion of the electrode assembly 10 housed in the outer case 20.

The electrode assembly 10 may include a first electrode plate 11, a second electrode plate 13 and a separator 15, which are sequentially stacked and wound in a jelly-roll type.

Hereinafter, the first electrode plate 11 is referred to as a positive electrode plate, and the second electrode plate 13 is referred to as a negative electrode plate.

One of ordinary skill in the art will appreciate that polarities of the first and second electrode plates 11, 13 may be reversed depending on the process of forming these electrode plates.

The positive electrode plate 11 is formed by applying a positive electrode active material to a positive electrode collector formed of aluminum, and includes a positive electrode uncoated portion to which the positive electrode active material is not applied.

The negative electrode plate 13 is formed by applying a negative electrode active material to a negative electrode collector formed of copper, and includes a negative electrode uncoated portion to which the negative electrode active material is not applied.

The separator 15 is interposed between the positive electrode plate 11 and the negative electrode plate 13 to prevent a short circuit therebetween, and has a porous surface acting as a channel for lithium ions.

A first electrode tab 17 is attached to the positive electrode uncoated portion to be electrically connected with a cap plate 31 of the cap assembly 30.

Further, in the negative electrode uncoated portion, a second electrode tab 19 is attached to the negative electrode uncoated portion to be electrically connected with an electrode terminal 33 of the cap assembly 30.

Thus, the first electrode tab 17 has the same polarity as the first electrode plate 11, and the second electrode tab 19 has the same polarity as the second electrode plate 13.

Hereinafter, the first electrode tab 17 is referred to as a positive electrode tab, and the second electrode tab 19 is referred to as a negative electrode tab.

Here, the positive and negative electrode tabs 17, 19 may be formed of nickel, and may be attached to the positive and negative electrode uncoated portions by ultrasonic welding or laser welding, but the present invention is not limited to the materials and attachment methods disclosed herein.

Figure 2A:
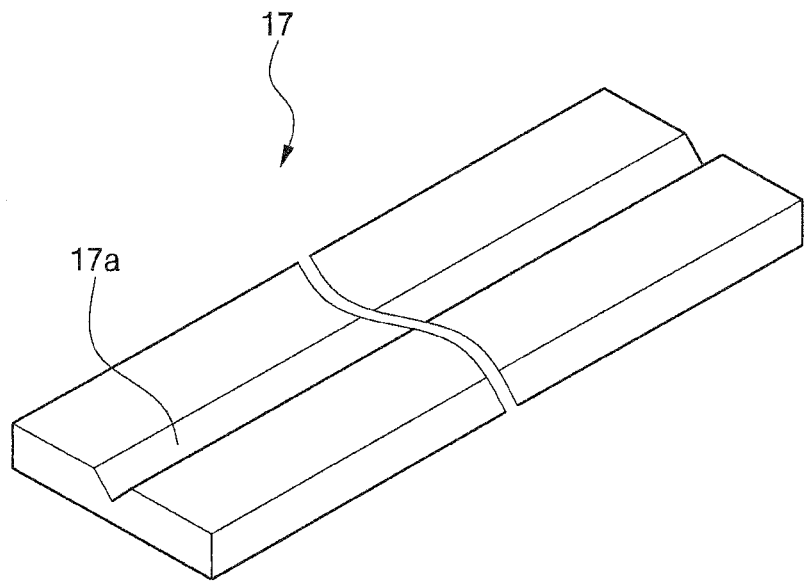
FIGS. 2A, 2B, 2C and 2D are perspective views illustrating various shapes of an electrode tab according to embodiments of the present invention.
Figure 2B:
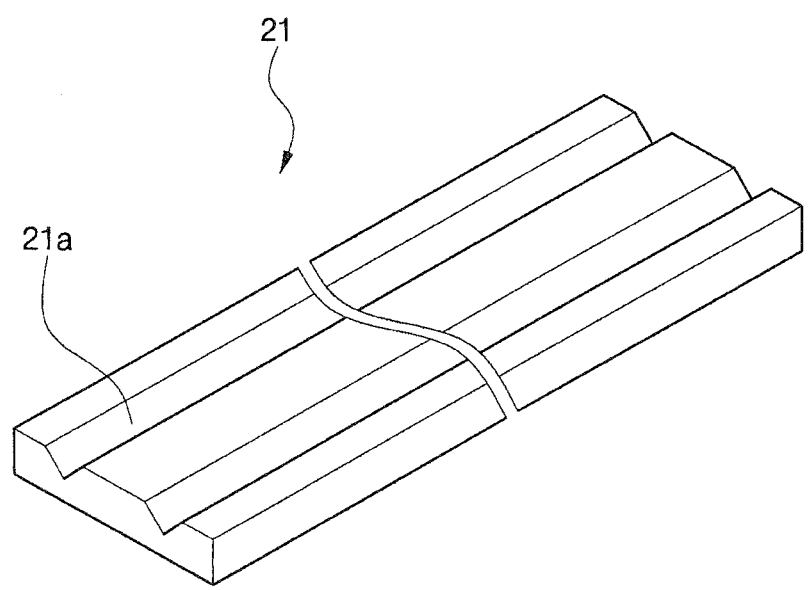

Referring to FIGS. 2A and 2B, two embodiments of positive electrode tabs are shown. The positive electrode tabs 17, 21 include one or more grooves 17a, 21a formed in a longitudinal direction of the tab and, in these embodiments, extending along a length of the positive electrode tabs.

FIG. 2A illustrates an electrode tab having one groove 17a generally in the middle of the width of the tab, and FIG. 2B illustrates an electrode tab 21 having two grooves 21a disposed at regular intervals across the width of the tab.

Further, if the tab has at least three grooves, they may be formed at regular intervals based across the width of the tab.

When the tab has as many grooves as possible, the grooves may be organically distorted according to the distortion of the electrode assembly. However, the present invention is not limited to the position and number of the groove.

FIGS. 2A and 2B illustrate positive electrode tabs 17, 21 having grooves 17a, 21a, but one of ordinary skill in the art will appreciate that similar grooves may also be formed in the negative electrode tab 19.

Figure 2C:
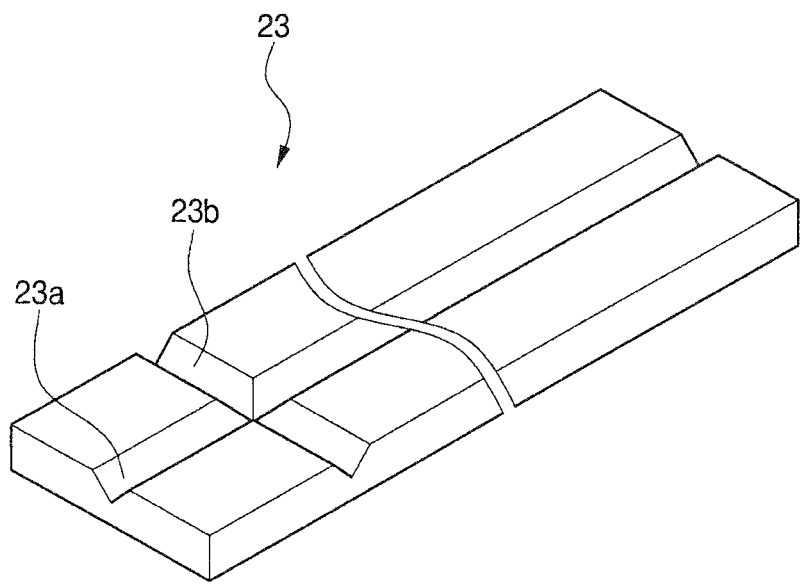
Figure 2D:
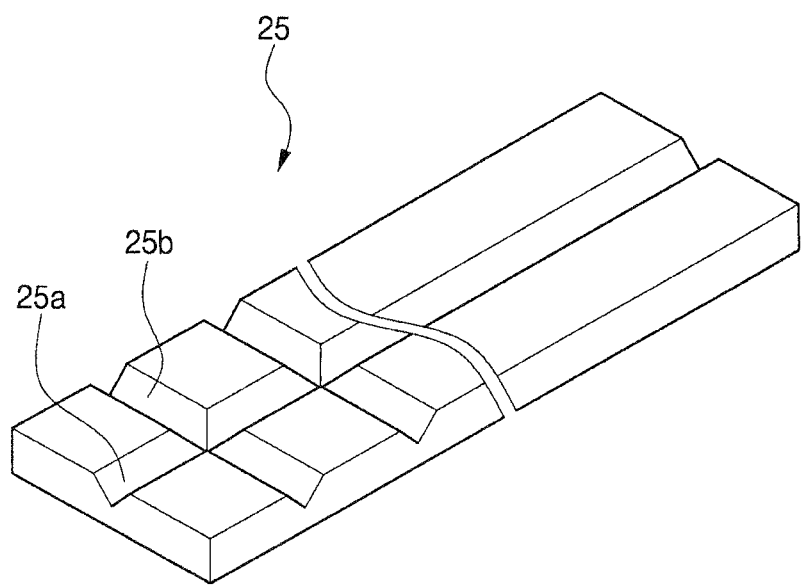

Referring to FIGS. 2C and 2D, positive electrode tabs 23, 25 may further include one or more grooves 23b or 25b formed in a width direction of the tab, in addition to a groove 23a, 25a formed in the longitudinal direction of the tab.

Further, FIGS. 2C and 2D illustrate the positive electrode tab 17, but one of ordinary skill in the art will appreciate that similar grooves may also be formed in the negative electrode tab 19.

Accordingly, the electrode tab may be organically distorted according to the distortion of the electrode assembly, thereby preventing damage to the electrode assembly due to an electrical short circuit, and thus increasing stability.

Referring again to FIG. 1, boundaries of the positive and negative electrode tabs 17, 19, which extend from the wound electrode assembly 10, are wound with insulating tape 18 to prevent a short circuit between the electrode plates 11, 13.

The positive electrode collector may be formed of stainless steel, nickel, aluminum, titanium, an alloy thereof, or carbon-, nickel-, titanium- or silver-treated aluminum or stainless steel, and preferably aluminum or an aluminum alloy.

The positive electrode collector may be formed in the form of a foil, a film, a sheet, a punched hole, a porous body, or a foaming agent, and in one embodiment is formed to a thickness of from about 1 to 50 µm, and more specifically from about 1 to 30 µm. The present invention is not limited to the type and thickness of the positive electrode collector described herein.

The positive electrode active material serves to intercalate or deintercalate lithium ions, which may include at least one selected from the group consisting of cobalt, manganese and nickel, or at least one of lithium composite oxides.

The negative electrode collector may be formed of stainless steel, nickel, copper, titanium, an alloy thereof, or carbon-, nickel-, titanium- or silver-treated copper or stainless steel, and preferably copper or a copper alloy.

The negative electrode collector may be formed in the form of a foil, a film, a sheet, a punched hole, a porous body, or a foaming agent, and in one embodiment is formed to a thickness of from about 1 to 50 µm, and more specifically from about 1 to 30 µm. The present invention is not limited to the type and thickness of the negative electrode collector described herein.

The negative electrode active material serves to intercalate or deintercalate lithium ions, which may include carbonic substances such as crystalline carbon, amorphous carbon, carbon complex and carbon fiber, lithium metal, or lithium alloys.

The separator 15 may be formed of a common material, for example, a thermoplastic resin such as polyethylene (PE) or poly propylene (PP), and may have a porous surface.

The porous separator 15 may melt at a temperature around a melting point of the thermoplastic resin due to an increase in internal temperature of the battery, thereby blocking its porosity and preventing it from being an insulating film.

Accordingly, the migration of the lithium ions between the positive and negative electrode plates 11, 13 is interrupted and blocks the flow of current, thereby stopping an increase in internal temperature of the battery.

Referring again to FIG. 1, the outer casing 20 may be formed of a metallic material having an open top portion, and houses the electrode assembly 10 and an electrolyte therein. The insulating case 40 is disposed at an upper portion of the electrode assembly 10.

The metallic material may include aluminum, an aluminum alloy or stainless steel, which is light and flexible. When the outer casing 20 is formed of such a metallic material, it may be used as an electrode terminal because of its polarity.

The outer casing 20 may be formed in a prismatic or oval shape, and the open top portion thereof is welded or thermally fused with the cap plate 31 to be sealed.

The cap assembly 30 includes the cap plate 31, an insulating gasket 32, an electrode terminal 33, an insulating plate 34, a terminal plate 35 and an electrolyte inlet plug 36.

The cap plate 31 is coupled to the opening of the can 20 to seal the opening of the outer casing 20.

The cap plate 31 has about the same size and shape as the opening, and has a terminal through-hole 311 into which the insulating gasket 32 and the electrode terminal 33 are inserted.

Further, in the cap plate 31, an electrolyte inlet 312 is formed to allow electrolyte to be injected into the outer casing 20, and coupled to the electrolyte inlet plug 36 to be sealed.

A vent 313 is formed in the cap plate 31 and has a notch allowing the vent to be easily fractured to exhaust gases when inner pressure of the battery increases.

The insulating gasket 32 is coupled to the terminal through-hole 311 formed in the cap plate 31, and formed of an insulating material to insulate the electrode terminal 33 from the cap plate 31.

Furthermore, a hole is formed in the center of the insulating gasket 32 to be coupled to the electrode terminal 33.

The electrode terminal 33 is inserted into the hole formed in the insulating gasket 32 to be coupled to the cap plate 31. A lower portion of the electrode terminal 33 may be connected to the terminal plate 35 through the cap plate 31.

The insulating plate 34 is disposed under the cap plate 31 to insulate an outer surface of the terminal plate 35, and has a hole to connect the electrode terminal 33 with the terminal plate 35.

The terminal plate 35 is disposed under the insulating plate 34, and formed of a conductive material. Then, the terminal plate 35 is connected with the electrode terminal 33 to make an electrical path.

Moreover, the negative electrode tab 19 may be electrically connected to a bottom surface of the terminal plate 35, allowing the electrode terminal 33 to serve as a negative electrode terminal.

The insulating case 40 is disposed at the upper portion of the electrode assembly 10 housed in the outer casing 20 to substantially prevent the movement of the electrode assembly 10 with respect to the outer casing.

Further, the insulating case 40 has a tab groove 41 and a tab hole 42 that keep the positive and negative electrode tabs 17, 19 spaced from each other to prevent a short circuit, and serve as a guide from which the tabs project.

Furthermore, the insulating case 40 may have an injection hole 43 functioning as a passage to easily inject the electrolyte through the electrode assembly 10.

Figure 3:
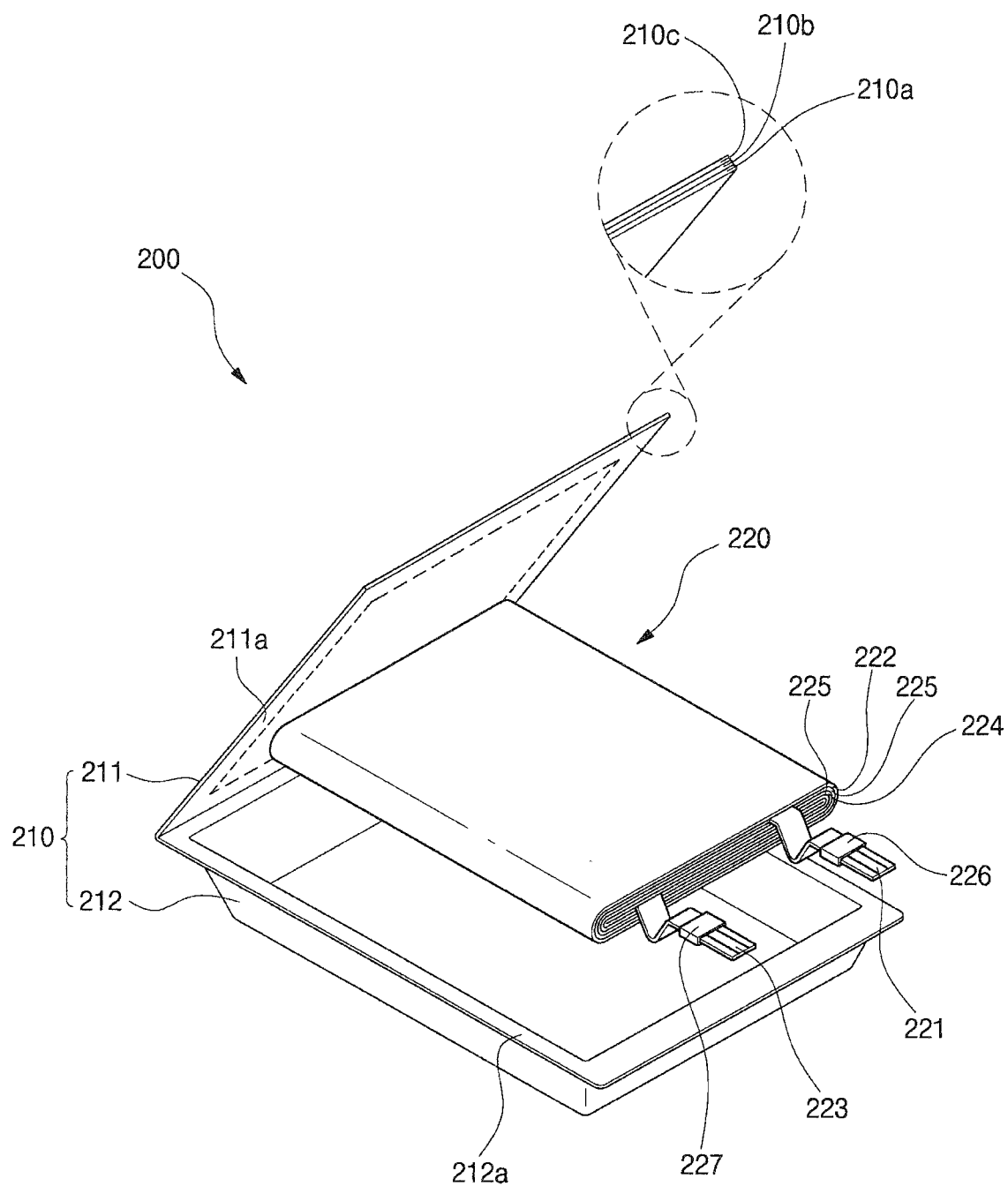
FIG. 3 is an exploded perspective view of a secondary battery according to a second embodiment of the present invention.

Referring now to FIG. 3, a pouch-type secondary battery 200 includes an pouch-type outer casing 210 having an upper outer casing 211 and a lower outer casing 212, and an electrode assembly 220 accommodated within the outer casing 210.

The upper and lower outer casings 211, 212 are joined to each other at one side, but the other sides are initially unsealed to accommodate the electrode assembly 220 within the outer casing 210.

One of the upper and lower outer casings 211, 212 has a space for accommodating the electrode assembly 220, and in the present embodiment, the space is formed in the lower outer casing 212.

Upper and lower sealing parts 211a and 212a are formed along edges of the upper and lower outer casings 211 and 212 to seal the outer casings by a common method such as thermal fusion.

The outer casing 210 may be formed in a multilayer structure of a thermal fusion layer 210a serving as a sealant with thermal fusibility, a metal layer 210b having mechanical strength, serving as a barrier layer against moisture and oxygen and made of a metallic material, and an insulating layer 210c.

The electrode assembly 220 is wound and includes a first electrode plate 222 connected with a first electrode tab 221, a second electrode plate 224 connected with a second electrode tab 223 and a separator 225 interposed between the two electrode plates 222, 224.

Here, the first and second electrode tabs 221, 223 have the same general configuration as the first and second electrode tabs 17, 19 described with reference to FIGS. 2A to 2D (the FIG. 2A embodiment being depicted in FIG. 3), so the detailed descriptions thereof will be omitted.

Further, portions of the first and second electrode tabs 221, 223 in contact with the sealing parts 211a, 212a may be wound with adhesive tab tape 226, 227 for sealing the outer casing.

According to embodiments of the present invention, when an electrode assembly is distorted due to an external pressure, an electrode tab attached to the electrode assembly is also distorted easily.

Thus, damage to the electrode assembly due to the electrode tab can be prevented, and stability increased.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
an outer casing including an open portion;
an electrode assembly within the outer casing;
a cap assembly on the open portion of the outer casing; and
electrode tabs electrically connecting the electrode assembly with the cap assembly,
wherein each of the electrode tabs includes a first side and a second side, wherein a length of the first side is larger than a length of the second side,
wherein at least one of the electrode tabs comprises a first longitudinal groove extending in a direction parallel with the first side of the electrode tabs.

2. The secondary battery according to claim 1, wherein the outer casing is a prismatic shape or an oval shape having rounded corners.

3. The secondary battery according to claim 1, wherein a length of the first longitudinal groove is same as the length of the first side.

4. The secondary battery according to claim 1, wherein each of the electrode tabs further includes a third side opposed to the first side, and
wherein a distance between the first longitudinal groove and the first side equals a distance between the first longitudinal groove and the third side.

5. The secondary battery according to claim 1, wherein at least one of the electrode tabs further includes a second longitudinal groove, the second longitudinal groove being parallel with the first longitudinal groove.

6. The secondary battery according to claim 5, wherein the first longitudinal groove is located between the first side and the second longitudinal groove, and a distance between the first longitudinal groove and the first side equals a distance between the first longitudinal groove and the second longitudinal groove.

7. The secondary battery according to claim 1, wherein at least one of the electrode tabs further comprises a first width groove extending in a direction parallel with the second side of the electrode tabs.

8. The secondary battery according to claim 7, wherein the first width groove crosses the first longitudinal groove.

9. A pouch-type secondary battery comprising:
an electrode assembly including a first electrode plate, a second electrode plate and a separator between the first electrode plate and the second electrode plate;

a pouch-type outer casing accommodating the electrode assembly and sealed at a sealing part;

a first electrode tab electrically connected with the first electrode plate; and a second electrode tab electrically connected with the second electrode plate, wherein the first electrode tab and the second electrode tab traverse the sealing part of the pouch-type outer casing, wherein at least one of the first electrode tab or the second electrode tab comprises a first longitudinal groove extending to the outside of the pouch-type outer casing.

10. The pouch-type secondary battery according to claim 9, further comprising a first adhesive tab tape surrounding the first electrode tab and a second adhesive tab tape surrounding the second electrode tab, wherein the first adhesive tab tape and the second adhesive tab tape are disposed at the sealing part of the pouch-type outer casing.

11. The pouch-type secondary battery according to claim 9, wherein the pouch-type outer casing includes an upper outer casing and a lower outer casing coupled with the upper outer casing, the lower outer casing including a space for accommodating the electrode assembly.

\* \* \* \* \*